Oct. 19, 1965 W. A. GODDARD 3,213,461

AIR BEARING HEAD

Filed Jan. 25, 1954 3 Sheets-Sheet 1

INVENTOR.
WILLIAM A. GODDARD
BY
John B. Aponsler
AGENT

Oct. 19, 1965 W. A. GODDARD 3,213,461

AIR BEARING HEAD

Filed Jan. 25, 1954 3 Sheets-Sheet 2

INVENTOR.
WILLIAM A. GODDARD
BY
John B. Sponsler
AGENT

Oct. 19, 1965 W. A. GODDARD 3,213,461

AIR BEARING HEAD

Filed Jan. 25, 1954 3 Sheets-Sheet 3

INVENTOR.
WILLIAM A. GODDARD
BY
John B. Sponsler
AGENT

United States Patent Office 3,213,461
Patented Oct. 19, 1965

3,213,461
AIR BEARING HEAD

William A. Goddard, Los Gatos, Calif., assignor to International Business Machines Corporation, New York, N.Y., a corporation of New York Filed Jan. 25, 1954, Ser. No. 406,011
6 Claims. (Cl. 346—74)

The present invention appertains to recording heads and relates more particularly to air stabilized recording heads.

As is well known to those familiar with either the electrostatic or magnetic recording art, it is often desirable to maintain the recording element at a constant distance from the recording surface, and it is an object of this invention to provide an improved air head for accomplishing this result.

Another object is to provide a more sensitive air head for maintaining a recording element at a predetermined distance from thhe recording surface, regardless of deformities or irregularities therein.

Still another object is to provide an air head having increased stability.

These and other objects and advantages will become apparent from thhe following description and accompanying drawings in which.

Figures 2, 3:
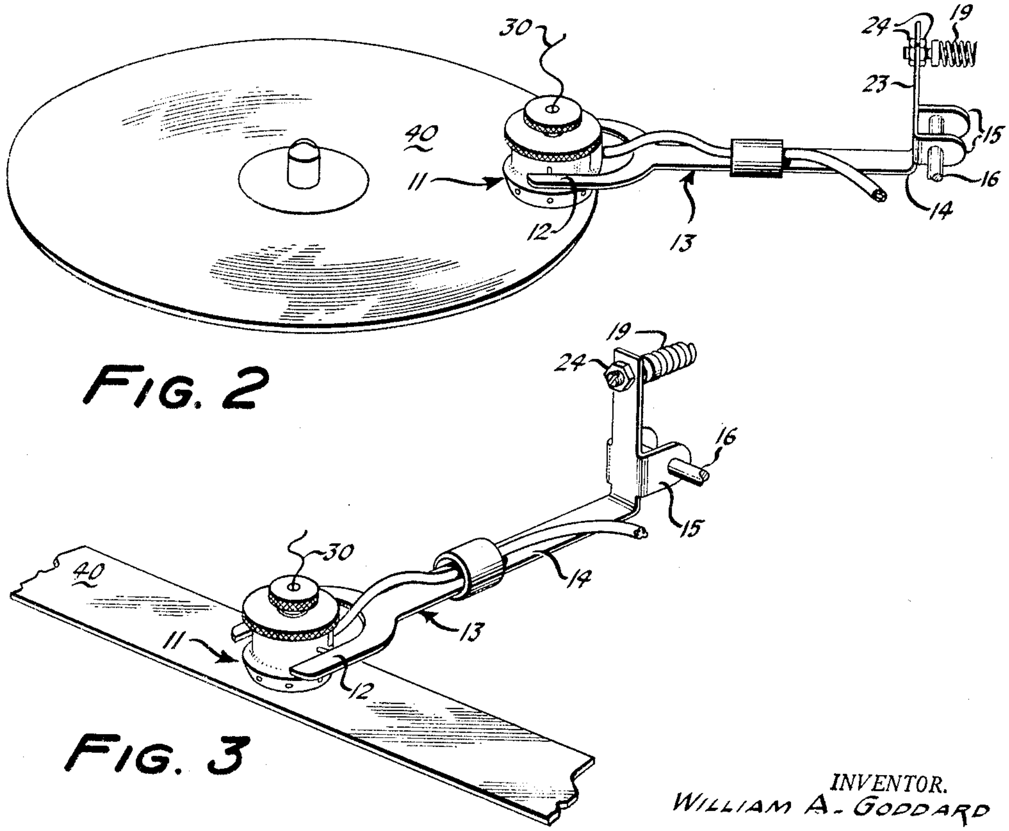
FIGS. 2 and 3 are perspective views of a modified form of the air head adapted for use with a disc and a tape, respectively.
Figures 4, 5:
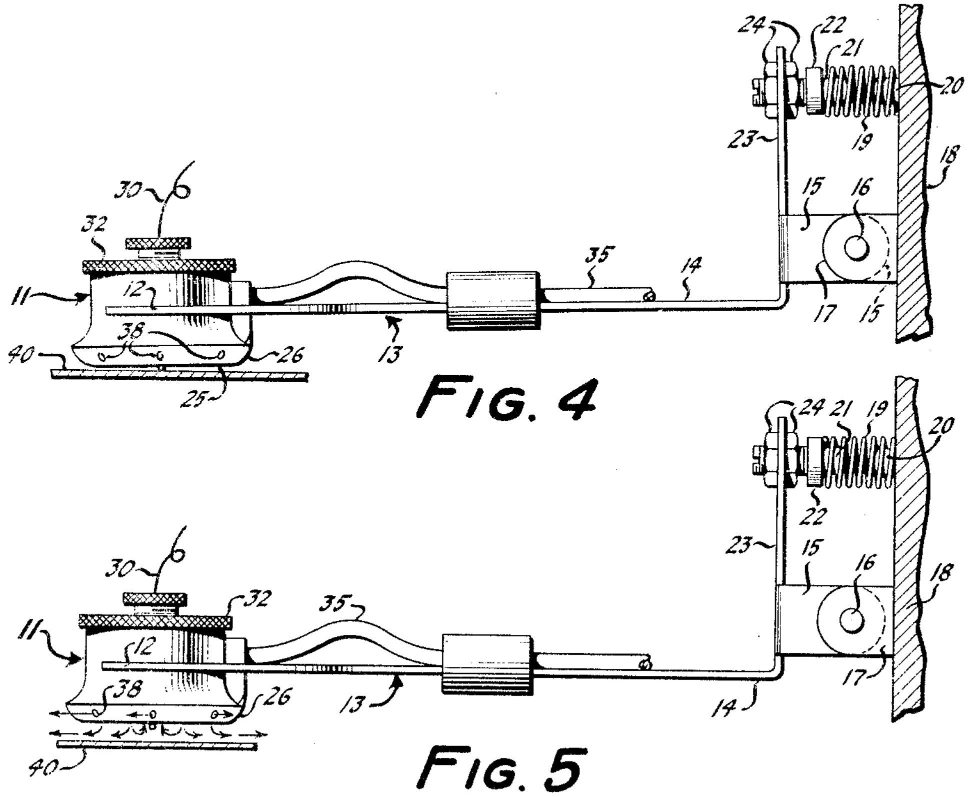
FIG. 4 is an elevation of the air head shown in FIGS. 2 and 3, in an inoperative position.
FIG. 5 is similar to FIG. 4, but shows the head in an operative position.

Referring to FIGS. 2 and 3, the embodiment of the invention disclosed therein comprises a head 11 pivotally supported between the arms 12 of a yoke 13 in any convenient manner. The base 14 of the yoke 13 is formed integrally with a bracket 15 which is journalled on a pin 16 supported by a pair of arms 17 (FIG. 4) suitably secured to a rigid structural member 18. A coil spring 19, one end of which is mounted on a stud 20 secured to the structural member 18 and the other end of which is mounted on the projecting end of a bolt 21 and abuts a collar 22 secured to thhe bolt 21, is provided to place a counterclockwise movement on the yoke for a purpose to become clear hereinafter. The bolt 21 is adjustably secured to the upwardly projecting end 23 of the yoke 13 by nuts 24 to permit the compression of the spring 19 to be varied as may be desired.

The air head 11 (FIG. 4) comprises a generally cylindrical block, the lower face 25 of which is planar and is formed with a circumferential lip 26 extending upwardly and outwardly therefrom. Extending downwardly through a centrally disposed channel 27 (FIG. 6) in the head 11 and threadedly engaged therein is a vertically adjustable support member 28. A recording element 29, which may be either of the magnetic or electrostatic type, is secured to the lower end of the support member 28, and said support member is axially apertured to receive a wire 30 arranged to connect the element 29 to a suitable electronic mechanism (not shown).

Figure 6:
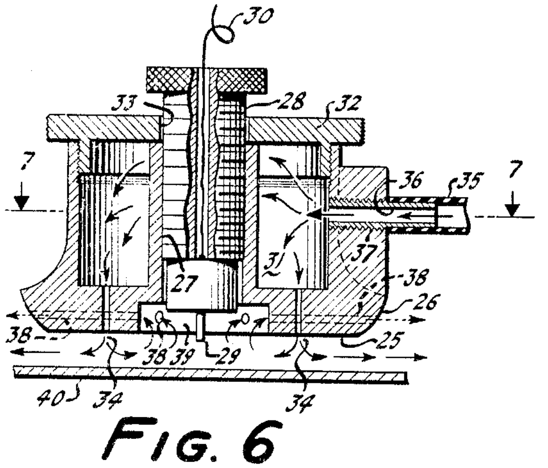
FIG. 6 is a vertical section of the air head shown in FIGS. 2 and 3.
Figure 7:
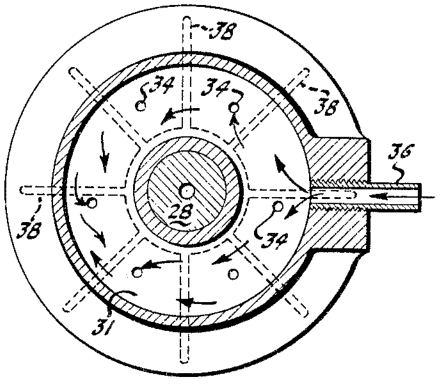
FIG. 7 is a horizontal section of the air head taken along line 7—7 of FIG. 6.

The head 11 (FIG. 6) is provided with a circular manifold 31, and a cover plate 32 is threadedly connected to the head 11 to enclose and seal said manifold from the atmosphere, said support member 28 being adapted to extend through an aperture 33 provided in the plate 32. A plurality of circularly disposed, equally spaced orifices 34 extend downwardly from the manifold 31 through the face 25 of the head 11 to the atmosphere. The manifold is supplied with clean, dry air under suitable pressure from a filtered supply tank 44 (FIG. 1) by a conduit 35 which is secured to a nipple 36 (FIG. 6) threadedly engaged by the walls of a passage 37 provided in the head 11 and connecting with the manifold 31. Additionally, several radially aligned vents 38 are arranged to extend laterally from a hollowed-out portion 39, located centrally of the face 25 to the exterior surface of the lip 26, substantially as shown in FIGS. 6 and 7.

In operation, the head 11 is supported adjacent a recording surface 40 and air under thhe desired pressure is supplied from tank 44 through conduit 35 to the manifold 31. Air is discharged from the manifold 31 through the orifices 34, and the exhausting air pushes the head 11 away from the recording surface 40. As is clearly apparent in FIG. 6, the escaping air is discharged from the orifices 34 to the outside atmosphere both radially outwardly, from between the head 11 and the recording surface 40, and inwardly through the hollowed-out portion 39, thence outwardly through the vents 38. In this way, a layer of escaping air discharged from the plurality of orifices 34 is provided over substantially all of the lower face 25 of the air head and provides the head with a maximum stability.

It has been found that when the head is in equilibrium, it will be positioned a known distance from the recording surface, which distance is a constant determined by physical characteristics of the head, such as the size, number and location of the orifices 34 and/or vents 38. Further, it has been found that, for a given head, moderate changes in the air pressure supplied to the manifold 31 have substantially no effect on this distance.

Since a given head will be maintained at a known distance from the recording surface, the recording element 29 carried by the head may be adjusted to locate it at the desired distance from the recording surface merely by adjusting the vertical disposition of the threaded support member 28 relative to the head 11. In a given installation, the recording element will at all times be automatically spaced a predetermined distance from the recording surface, regardless of deformities or irregularities therein, since the air head will follow an irregular or deformed recording surface. The function of the spring 19 is to provide the head 11 with additional sensitivity which will enable it to follow more accurately any irregularities or variations present in the recording surface. The bias provided by the spring 19 may be set to that desired by the proper adjustment of the nuts 24 on the bolt 21.

Figure 1:
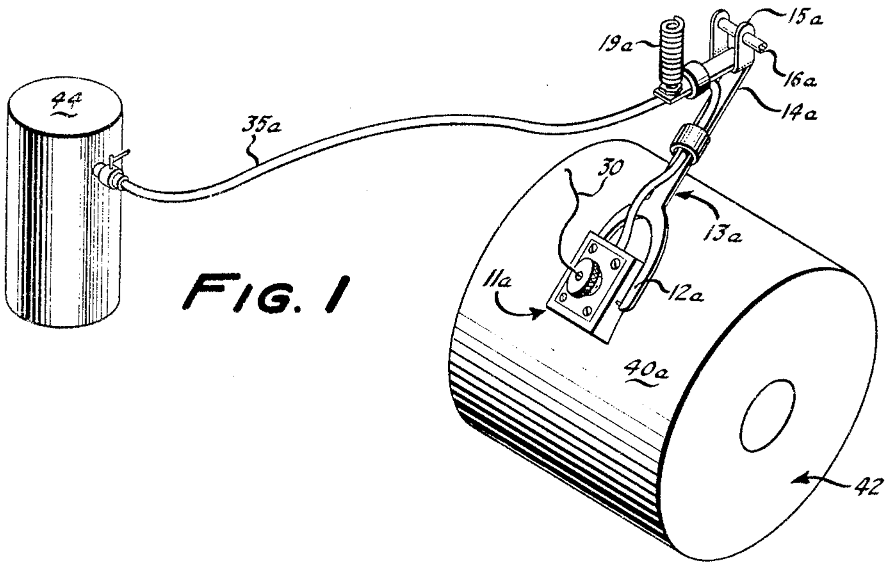
FIG. 1 is a perspective view of the air head of the invention adapted for use with a cylindrical recording surface.
Figure 8:
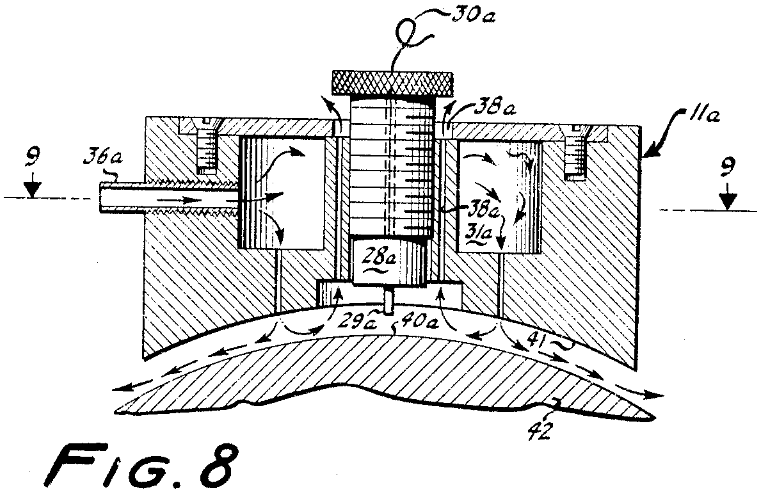
FIG. 8 is a vertical section of the air head shown in FIG. 1.
Figure 9:
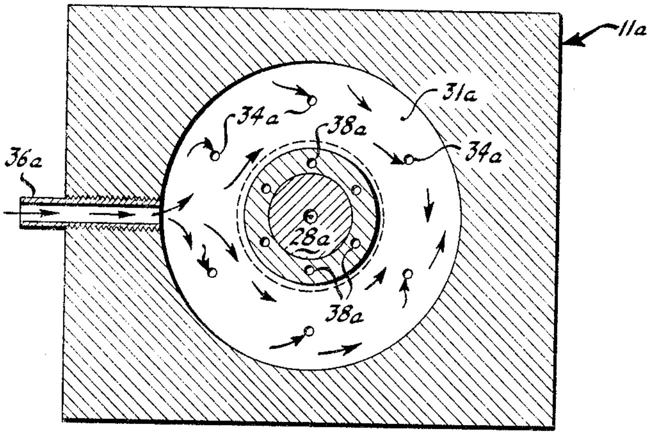
FIG. 9 is a horizontal section of the air head taken along line 9—9 of FIG. 8.

The embodiment of the air head shown in FIGS. 1, 8 and 9 is similar to the air head above described; however, it has been modified for use with a cylindrical recording surface. Referring to FIG. 8, it will be seen that the rectangular air head 11*a* is provided with a concave lower face 41 which has been shaped to conform to the convex surface of the drum 42 with which it is to be used. Additionally, it should be noted that the vents 38*a* extend vertically through the head 11*a* and exhaust from the top thereof. Since the remaining structure, as well as the operation of the device, is substantially identical to that previously described, it need not be repeated, and it is sufficient to say that the head 11*a* will follow the surface of the cylinder 42 to maintain the recording element 29*a* at a constant spacing therefrom.

While there have been shown, described and pointed out the fundamental novel features of the invention, as applied to the preferred embodiments, it will be understood that various omissions, substitutions and changes in the form and details of the device illustrated and in its operation may be made by those skilled in the art, without departing from the scope and spirit of the invention. It is the intention, therefore, to be limited only as indicated by the following claims.

What I claim is:

1. A recording device comprising in combination a recording medium, a magnetic transducer element, a recording head for supporting said element and positionable adjacent said medium, means including a plurality of inlet vents disposed around said element for supplying fluid flow between said medium and said head resulting in pressure areas below and above ambient pressure, said areas of below ambient pressure causing a first force urging said medium and said head together and said areas of above ambient pressure causing a second force smaller than said first force urging said medium and said head apart, and an outlet vent passage extending between an area of high pressure defined by said inlet vents and an area of ambient pressure to reduce said second force whereby said first force causes a closer spacing between said medium and said head.

2. A recording head positionable adjacent a magnetic recording medium, said head comprising a magnetic recording element and a body member for supporting said element in recording relationship with said medium, said body member including a face portion having a plurality of inlet vents for supplying a fluid stream in the space defined by said face and said medium to reduce the pressure therebetween relative to the ambient pressure to cause said head to be biased toward said medium, and a plurality of outlet vents connecting the space intermediately of said inlet vents to an area of ambient pressure.

3. The invention set forth in claim 2 wherein said inlet vents are spaced circumferentially on a circle surrounding said element.

4. A magnetic storage device which includes a rotatable member having a magnetizable surface, an electromagnetic head, a body surrounding said head and providing a surface fixed relative to said head and adjacent said magnetizable surface of the rotatable member, means mounting said body adjacent said magnetizable surface for movement substantially perpendicular thereto, means biasing said body toward said magnetizable surface, and means operative to produce a thin fluid film between said magnetizable surface and the adjacent surface of said head, which film constitutes the sole medium maintaining separation of said adjacent surfaces, said means including means operable to introduce a stream of air between said adjacent surfaces adjacent said electromagnetic head.

5. A magnetic storage device which includes a rotatable drum having a magnetizable periphery, an electromagnetic head, a body surrounding said head and providing a surface fixed relative to said head and adjacent the peripheral surface of said drum, means so mounting said head adjacent the periphery of said drum that said head may move in a path substantially radially of said drum, means biasing said body toward the peripheral surface of said drum, and means operative to produce a thin fluid film between the adjacent surfaces of said drum and head, which film constitutes the sole medium maintaining separation of said adjacent surfaces, said means including means operable to introduce a stream of air between said surfaces adjacent said electromagnetic head.

6. A magnetic storage device which includes: a rotatable member having a magnetizable surface; an electromagnetic head; a body surrounding said head and providing a surface fixed relative to said head and adjacent the magnetizable surface of said member; means pivotally mounting said body adjacent the magnetizable surface of said member for movement in a predetermined path toward and from said magnetizable surface; means biasing said body toward the magnetizable surface of said member; and means operative to produce a thin fluid film between the adjacent surfaces of said member and head, which film constitutes the sole medium maintaining separation of said adjacent surfaces, said means including means operable to introduce a stream of air between said surfaces adjacent said electromagnetic head.

References Cited by the Examiner

UNITED STATES PATENTS

| | | | |
|---|---|---|---|
| 1,990,548 | 2/35 | Keller | 179—100.2 |
| 2,612,566 | 9/52 | Anderson et al. | 346—74 |
| 2,695,199 | 11/54 | Blizard | 308—9 |

IRVING L. SRAGOW, *Primary Examiner.*

NEWTON N. LOVEWELL, ROBERT H. ROSE, L. MILLER ANDRUS, STEPHEN W. CAPELLI, *Examiners.*